United States Patent [19]

Sköld

[11] Patent Number: 5,373,507

[45] Date of Patent: Dec. 13, 1994

[54] DEVICE AND METHOD FOR SYNCHRONIZING AND CHANNEL ESTIMATION IN A TDMA RADIO COMMUNICATION SYSTEM

[75] Inventor: Johan Sköld, Åkersberga, Sweden

[73] Assignee: Telefonaktiebolaget L M Ericsson, Stockholm, Sweden

[21] Appl. No.: 3,474

[22] Filed: Jan. 12, 1993

[30] Foreign Application Priority Data

Jan. 13, 1992 [SE] Sweden .................. 9200079-3

[51] Int. Cl.$^5$ .................................. H04L 7/08
[52] U.S. Cl. .................. 370/105.1; 370/105.4; 375/114
[58] Field of Search ........... 370/95.3, 105.1, 104.1, 370/105.4; 375/94, 95, 96, 114, 116

[56] References Cited

U.S. PATENT DOCUMENTS

| | | | |
|---|---|---|---|
| 4,873,683 | 10/1989 | Borth et al. | 370/95.1 |
| 5,090,028 | 2/1992 | Crebouw | 375/96 |
| 5,228,057 | 7/1993 | Larsson | 375/114 |
| 5,241,545 | 8/1993 | Kazecki et al. | 375/114 |

FOREIGN PATENT DOCUMENTS 0295226 3/1988 European Pat. Off.

*Primary Examiner*—Benedict V. Safourek
*Attorney, Agent, or Firm*—Burns, Doane, Swecker & Mathis

[57] ABSTRACT

A method of synchronizing a received signal frame in a TDMA radio system with a locally generated (TR) training sequence and of determining a channel estimate based on the comparison the received signal frame and the locally generated training sequence. A center of energy value is calculated for a first vector having M correlation values. A second vector having N consecutive correlation values distributed around the center of energy is chosen to form the channel estimate. The center of energy in the second vector can be chosen as synchronizing position.

23 Claims, 2 Drawing Sheets

DEVICE AND METHOD FOR SYNCHRONIZING AND CHANNEL ESTIMATION IN A TDMA RADIO COMMUNICATION SYSTEM

FIELD OF THE INVENTION

The present invention relates to a device and method for synchronizing and channel estimation in a TDMA radio communication system.

BACKGROUND OF THE INVENTION

In TDMA radio communication systems (TDMA=Time Division Multiple Access) information is transmitted on a channel in the form of signal frames, that are transmitted by the transmitter during evenly distributed time intervals. In the spaces between these signal frames the transmitter is "silent". In order to synchronize the receiver to these signal frames each signal frame comprises a known synchronization word in predetermined positions within the signal frame. In, for example, the European GSM system for mobile telephony this synchronization word is 26 bits long. When the receiver expects a new signal frame from the transmitter a training sequence, that is identical to the 16 central bits of the synchronization word, is generated by a training sequence generator in the receiver. The received signals are compared to the locally generated training sequence, and when the best possible correlation is obtained between this sequence and the received signals synchronization is considered to exist between the locally generated and the received signal.

In addition to the synchronization itself the training sequence is also used for channel estimation. Since the radio channel often is subjected to multiple path propagation the receiver comprises some sort of equalizer to eliminate this phenomenon. The equalizer requires a time limited estimate of the impulse response of the channel. This impulse response can be obtained from the correlation signal. For this purpose not only a synchronization position but an interval or a window defining the multiple path propagation and indicating where the equalizer is to operate is required.

A previously known method of finding the position of the window of the equalizer is to choose that interval of fixed length that contains most of the energy from the correlation. A drawback of this method is that disturbances in the received signal can give a correlation peak far away from the actual peak. For this reason the disturbance has a large instantaneous influence on the position of the window and creates a variance (uncertainty) in this position, which results in deteriorated receiver performance.

SUMMARY OF THE INVENTION

The present invention relates to a device and method for providing a more robust channel estimate in a TDMA radio communication system. The invention involves calculating a center of energy value (w) of a first vector having M correlation values between a synchronization sequence and M parts of a signal frame, which are partially overlapping and mutually displaced one sampling interval. The value w is then rounded to the nearest integer to form a preliminary window center position $m_w$ in the first vector.

In one embodiment of the present invention, N consecutive correlation values distributed around the preliminary window center position $m_w$ are chosen to form a second vector of N correlation values for channel estimation.

In another embodiment, $2L+1$ partially overlapping vectors which are mutually time displaced one sampling interval, each comprising N consecutive correlation values distributed around the preliminary window center position $m_w$, where $N=2K+1$, are chosen. Then, the vector of these $2L+1$ chosen vectors that has the largest energy content, $E_n$, is selected as a second vector of N correlation values for channel estimation.

Further, the center position of the second vector in the first vector can be output as the final synchronization position m.

In another embodiment, the center of energy (x) within the chosen second vector is calculated and this value is added to the center position $m_w+1$ of the second vector and the position thus obtained is output as the final synchronization position m.

In still another embodiment of the present invention, the synchronization position m of a signal frame in a vector in a TDMA radio communication system is determined. The vector comprises M correlation values between a synchronization sequence and M parts of the signal frame, which parts are partially overlapping and mutually time displaced one sampling interval. The center of energy (w) is calculated and a synchronization position m is formed.

BRIEF DESCRIPTION OF THE DRAWINGS

The invention, together with further objects and advantages thereof, may best be understood by making reference to the following description taken together with the accompanying drawings, in which.

DETAILED DESCRIPTION OF THE PREFERRED EMBODIMENTS

Figure 1:
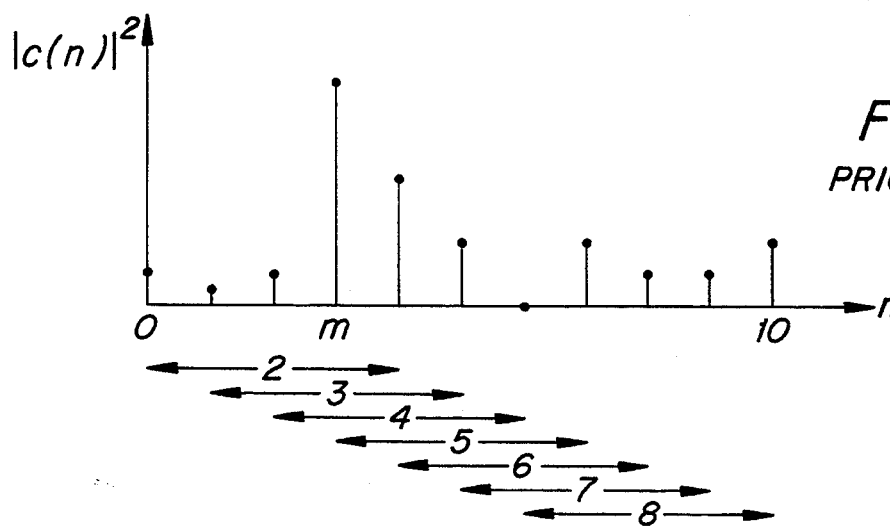
FIG. 1 shows a correlation-time diagram illustrating a previously known method to determine the synchronization position and channel estimate in a TDMA radio communication system.

FIG. 1 shows a correlation-time diagram, in which the sampling instances n run along the X-axis and the squared magnitude of the correlation between the locally generated training sequence and the received signal runs along the Y-axis.

The invention will be described below with reference to the European GSM-system. In this system a synchronization word comprises 26 bits. The 16 central bits in this word have good correlation properties when correlated with the entire synchronization word, that is a maximum correlation$=16$ in the central position and a correlation of 0 in the remaining ten positions ($C(k)=[0\ 0\ 0\ 0\ 0\ 16\ 0\ 0\ 0\ 0\ 0]$). These 16 central bits are generated as a training sequence in a training sequence generator in the receiver. This training sequence is used for forming, for example, 11 correlation values with the received signal frame. The squared magnitudes of these correlation values $c(n)$ are shown in FIG. 1. The final synchronization position is chosen by comparing mutually displaced windows, each containing 5 correlation values, with respect to energy contents. The central position of that window that contains the most energy is output as the synchronization position. Additionally the 5 correlation values c(n) within this window are output as a channel estimate to the equalizer. In FIG. 1, the different windows have been indicated with reference designations 2–8, where these numbers indicate the central positions of the windows in the correlation vector that is formed by the 11 correlation values. In the example shown in FIG. 1, the previously known method will therefore choose synchronization position m=3, since the correlation peak lies at position 3 and the energy also is concentrated around this position.

Figure 2:
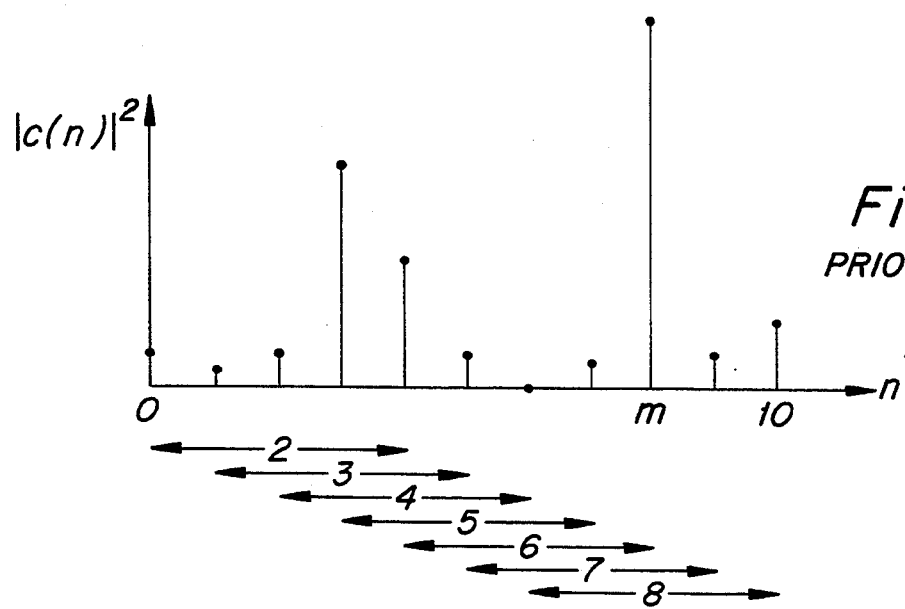
FIG. 2 shows a corresponding correlation-time diagram in a case where the radio channel is subjected to disturbance.

In practice the correlation peak is not as unambiguously defined as in FIG. 1. Rather the received signal may be disturbed by noise and by other transmitters, which results in disturbed channel estimates. FIG. 2 shows an unfavourable case, in which a disturbance peak has been introduced into correlation position 8. If this peak is sufficiently high the result of the previously known method can be that the total energy for 5 correlation values happens to be larger around the disturbance than around the correlation peak. In this case, the previously known method can set m=8 instead of the proper value 3. Furthermore, the channel equalizer will receive correlation values around the disturbance peak at m=8, which means that the equalizer receives a very poor estimate, since the estimate is based on a disturbance peak.

Figure 3:
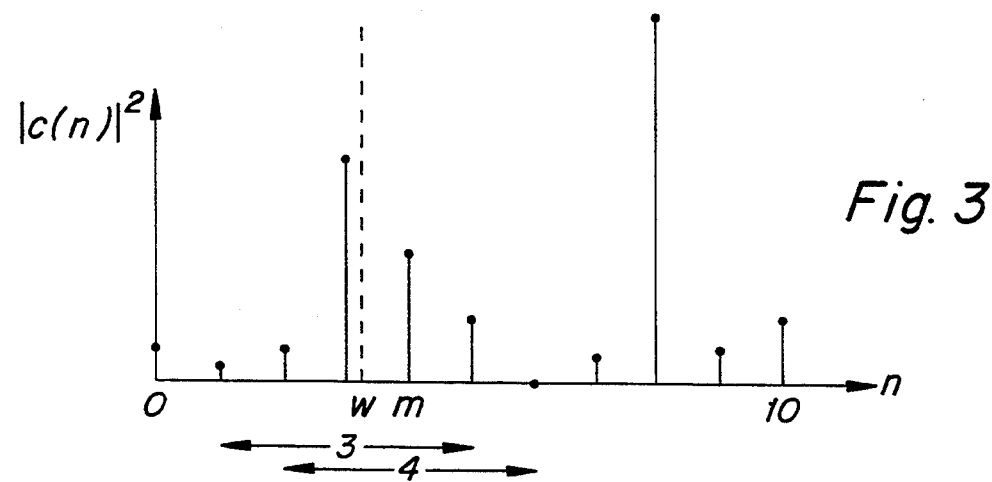
FIG. 3 shows a correlation-time diagram illustrating the method of the invention in the disturbed case of FIG. 2.

FIG. 3 illustrates a preferred embodiment of the method in accordance with the invention.

The method in accordance with the invention can be divided into several steps. In a first step the center of energy w of a first vector, having M correlation values between a synchronization sequence and M parts of a signal frame, which are partially overlapping and mutually displaced one sampling interval, is calculated. Vectors are overlapping when they have at least one common element. (As used herein, m parts of a signal frame are overlapping.) Furthermore, the elements of these overlapping vectors are consecutive correlation values. Since the correlation values correspond to different positions in the received synchronization field, the correlation values correspond to different sampling times and are therefore displaced one sampling interval. For example, by taking five consecutive correlation values to form a first vector and then shifting attention to the next five consecutive sampling values, one obtains two vectors with partially the same elements which are time displaced one sampling interval. The center of energy w is calculated in accordance with the formula:

$$w = \frac{\sum_{k=0}^{M-1} k|c(k)|^2}{\sum_{k=0}^{M-1} |c(k)|^2}$$

where M is the number of correlation values. A suitable value for M has proven to be, for example, the value 11. The obtained value is rounded to a preliminary window position $m_w$ by rounding the obtained value w to the nearest integer.

In a second step the energy of the correlation values c(n) that are contained in two windows around this preliminary central window position are calculated in accordance with the formula:

$$E_n = \sum_{j=-K}^{K} |c(j + m_w + n)|^2$$

$$n = 0, 1$$

where 2K+1=N, that is the number of correlation values in each window, for example, 5. In FIG. 3 this method implies that w will lie near 3, the preliminary window center position will be rounded to 3, and two windows centered around positions 3 and 4 are compared with respect to energy contents. The coefficients c(n) of that window that has the largest energy content is output to the equalizer as a channel estimate.

The final synchronization position m can be decided in several ways. One way is, as in the previously known method, to simply choose the center position of the window. Another way is to determine the center of energy in the chosen window in accordance with the formula:

$$x = \frac{\sum_{j=-K}^{K} j|c(j + m_w + n)|^2}{\sum_{j=-K}^{K} |c(j + m_w + n)|^2}$$

where $m_w+n$ designates the central position in a chosen window.

In the example described, only two windows around the preliminary window center position $m_w$ are examined, However, it is possible to choose more windows than two, i.e., 2L+1 windows may be chosen. For example, 5 windows can be chosen around the preliminary window center position $m_w$. The number of windows can be chosen in dependence of the current time dispersion. For instance, the number of windows can be chosen proportionally to the delay spread s defined in accordance with the formula:

$$s = \sqrt{\frac{\sum_{k=0}^{M-1} (k - w)^2 |c(k)|^2}{\sum_{k=0}^{M-1} |c(k)|^2}}$$

Furthermore it is appreciated that the number of correlation values in each window is not limited to 5, but that other values are also possible.

An essential advantage of the present invention is that the determination of the center of energy and the locking of the search window to values around this center gives a more robust determination of both the synchronization position and the channel estimate. The reason for this is that a single disturbance peak in the correlation does not have such a strong influence on the calculation of the center of energy.

Figure 4:
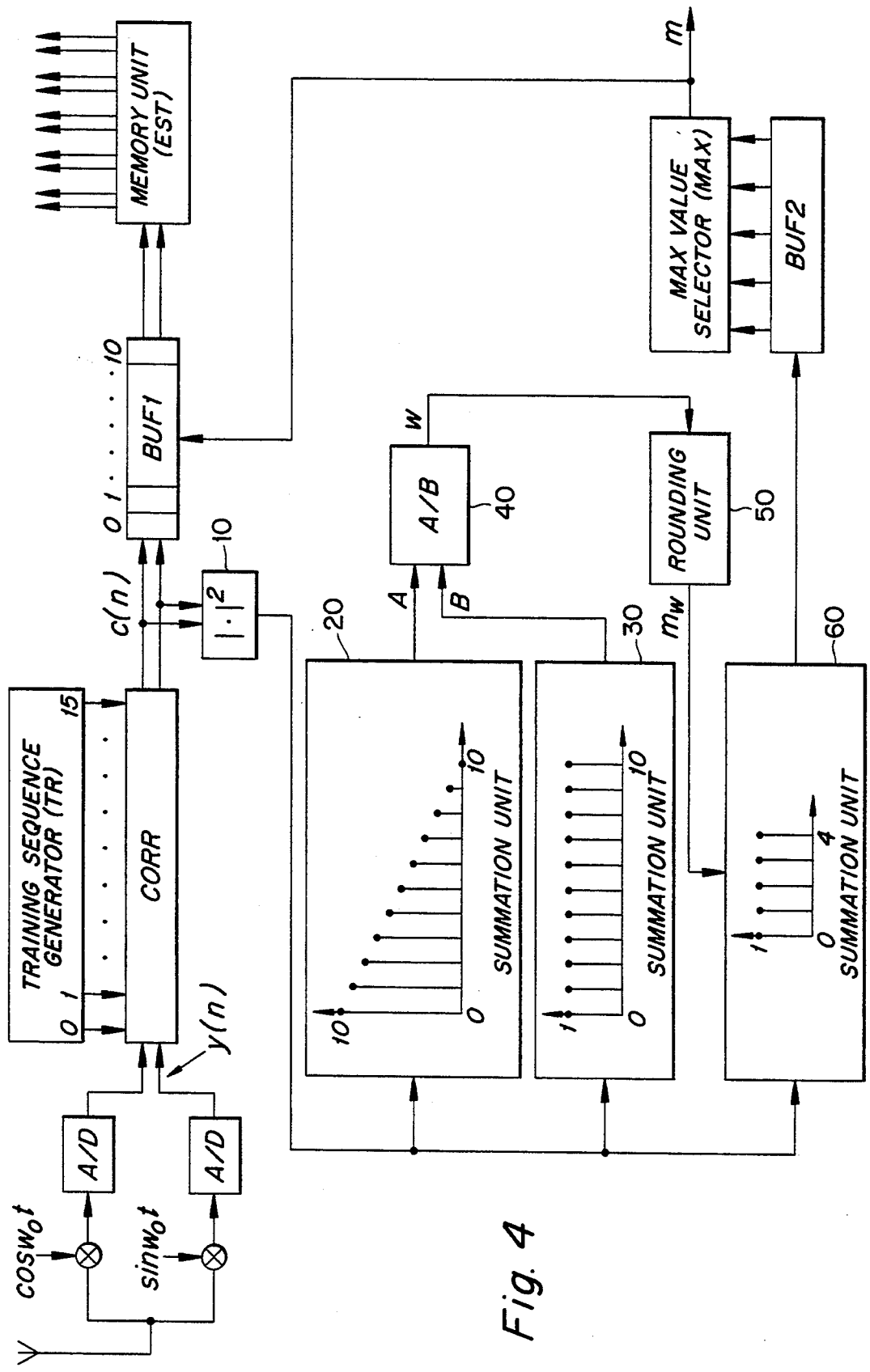
FIG. 4 shows a preferred embodiment of an apparatus for performing the method in accordance with the invention.

A preferred embodiment of an apparatus for performing the method in accordance with the invention will now be described with reference to FIG. 4.

The signal received by the receiver over an antenna is in a mixer converted to a base band signal and is in two A/D-converters divided into a complex input signal y(n) in a conventional way. This input signal is input a correlator CORR correlated with a training sequence from a training sequence generator TR local to said receiver. This training sequence generator outputs 16 values to correlator CORR. The correlation values c(n)

of correlator CORR are stored in a buffer BUF1. In this embodiment this buffer contains 11 memory positions for 11 complex correlation values c(n).

In a unit 10, the square of the magnitude of each correlation value c(n) is formed. These squared values are output to a summation unit 20, which calculates a weighted average of the 11 input signals, where the weighting coefficients in integer steps run from 10 down to 0. Summation unit 20 can be realized as an FIR-filter. In a similar way the sum of the squared magnitudes of the correlation coefficients c(n) are formed in a summation unit 30. This unit can also be realized as a FIR-filter, in which the filter coefficients are all set equal to 1.

The output signal A from summation unit 20 is input to a division unit 40 and divided by the output signal B from summation unit 30 to form the center of energy w. In a rounding unit 50, w is rounded to the nearest integer $m_w$. This value locks the reference position for a summation unit 60, for instance a FIR-filter, that can perform the energy calculation for, for example, 5 windows distributed around position $m_w$ and mutually displaced one sampling step, each window containing the squared magnitudes of each of the 5 correlation values c(n). These 5 sums, which represent the energy within each window, are stored in a buffer BUF2. In a unit MAX these 5 values are compared and the largest value is chosen, that is that window is chosen that has the largest energy content. The, center position m in this window can be an output signal. In this embodiment, this output signal also defines the synchronization position. Alternatively the center of energy within the window can be calculated as indicated above for the final determination of the synchronization position.

The window center position m is also input to buffer BUF1, from which 5 correlation values c(n) centered around this position are chosen for transfer to a memory unit EST for storing the channel estimate. These 5 complex values are then transferred to the equalizer for channel equalization.

The present invention has been described with reference to the European GSM-system. However, it is appreciated that the same principles also can be used in, for instance, the American mobile radio communication system in accordance with the standard IS-54. In fact the invention can be used in any TDMA-like-system that is based on synchronization of a received signal with a locally generated training sequence.

It will be understood by those skilled in the art that various modifications and changes may be made to the present invention without departure from the spirit and scope thereof, which is defined by the appended claims.

I claim:

1. A method of channel estimation in a TDMA radio communication system comprising the steps of:
   calculating a center of energy value w of a first vector having M correlation values between a synchronization sequence and M parts of a signal frame, which are partially overlapping and mutually displaced one sampling interval, substantially in accordance with the formula $$w = \frac{\sum_{k=0}^{M-1} k|c(k)|^2}{\sum_{k=0}^{M-1} |c(k)|^2}$$

where c(k) designates a correlation value in position k in said first vector and M is an integer;
   rounding the value w to a nearest integer to form a preliminary window center position $m_w$ in said first vector; and
   choosing N consecutive correlation values distributed around said preliminary window center position $m_w$ to form a second vector of N correlation values for channel estimation where N is an integer.

2. The method of claim 1, wherein said first vector comprises 11 correlation values, that is M=11.

3. The method of claim 1, wherein said second vector comprises 5 correlation values, that is N=5.

4. The method of claim 1 wherein said calculating step further comprises the steps of:
   receiving a radio signal and converting said radio signal into a complex input signal; and
   correlating said complex input signal with a training sequence to generate correlation values.

5. The method of claim 4 wherein said correlation values are generated by a correlator and said training sequence is generated by a training sequence generator local to said correlator.

6. A method for channel estimation in a TDMA radio communication system comprising the steps of:
   calculating a center of energy value w of a first vector having M correlation values between a synchronization sequence and M parts of a signal frame, which are partially overlapping and mutually displaced one sampling interval, substantially in accordance with the formula $$w = \frac{\sum_{k=0}^{M-1} k|c(k)|^2}{\sum_{k=0}^{M-1} |c(k)|^2}$$

where c(k) designates a correlation value in position k in said first vector and M is an integer;
   rounding the value w to a nearest integer to form a preliminary window center position $m_w$ in said first vector;
   choosing 2L+1 partially overlapping vectors which are mutually time displaced one sampling interval, each comprising N consecutive correlation values distributed around said preliminary window center position $m_w$, where N=2K+1 and K, L, and N are integers; and
   choosing a vector from the 2L+1 chosen vectors that has a largest energy content $E_n$, that is that vector that maximizes the expression $$E_n = \sum_{j=-K}^{K} |c(j + m_w + n)|^2$$

$$n = -L, \ldots, L$$

as a second vector of N correlation values for channel estimation where $|c(j+m_w+n)|^2$ designates a correlation value magnitude.

7. The method of claim 6, further comprising the step of choosing L in dependence of the current time dispersion.

8. The method of claim 7, further comprising the step of choosing L proportional to the delay spread s defined substantially in accordance with $$s = \sqrt{\frac{\sum_{k=0}^{M-1}(k-w)^2|c(k)|^2}{\sum_{k=0}^{M-1}|c(k)|^2}}.$$

9. The method of claim 6, further comprising the step of providing a center position of said second vector in said first vector as a final synchronization position m.

10. The method of claim 6, further comprising the steps of:

calculating a center of energy x within said second vector substantially in accordance with the formula $$x = \frac{\sum_{j=-K}^{K} j|c(j+m_w+n)|^2}{\sum_{j=-K}^{K} |c(j+m_w+n)|^2}$$

where $m_w+1$ designates a center position of said second vector in said first vector;

adding the value of x to the center position $m_w+1$ of said second vector to produce a position value; and providing the position value obtained in the previous step as a final synchronization position m.

11. The method of claim 6, wherein said first vector comprises 11 correlation values, that is M=11.

12. The method of claim 6, wherein said second vector comprises 5 correlation values, that is N=5.

13. A method for channel estimation in a TDMA radio communication system comprising the steps of:

calculating a center of energy value w of a first vector having M correlation values between a synchronization sequence and M parts of a signal frame, which are partially overlapping and mutually displaced one sampling interval, substantially in accordance with the formula $$w = \frac{\sum_{k=0}^{M-1} k|c(k)|^2}{\sum_{k=0}^{M-1} |c(k)|^2}$$

where c(k) designates a correlation value in position k in said first vector and M is an integer;

rounding the value w to a nearest integer to form a preliminary window center position $m_w$ in said first vector;

choosing two partially overlapping vectors which are mutually time displaced one sampling interval, each comprising N consecutive correlation values surrounding said preliminary window center position $m_w$, where N=2K+1 and K and N are integers; and choosing a vector from the two chosen vectors that has a largest energy content $E_n$, that is that vector that maximizes the expression $$E_n = \sum_{j=-K}^{K} |c(j+m_w+n)|^2$$

$$n = 0, 1$$

as a second vector of N correlation values for channel estimation where $|c(j+m_w+n)|^2$ designates a correlation value magnitude.

14. The method of claim 13, further comprising the step of providing a center position of said second vector in said first vector as a final synchronization position m.

15. The method of claim 13, further comprising the steps of:

calculating a center of energy x within said chosen second vector substantially in accordance with the formula $$x = \frac{\sum_{j=-K}^{K} j|c(j+m_w+n)|^2}{\sum_{j=-K}^{K} |c(j+m_w+n)|^2}$$

where $m_w+1$ designates a center position of said second vector in said first vector;

adding the value of x to the center position $m_w+1$ of said second vector to produce a position value; and providing the position value obtained in the previous step as a final synchronization position m.

16. The method of claim 13, wherein said first vector comprises 11 correlation values, that is M=11.

17. The method of claim 13, wherein said second vector comprises 5 correlation values, that is N=5.

18. A method of determining a synchronization position m of a signal frame in a vector in a TDMA radio communication system, said vector comprising M correlation values between a synchronization sequence and M parts of said signal frame, which parts are partially overlapping and mutually time displaced one sampling interval, comprising the steps of:

calculating a center of energy w substantially in accordance with the formula $$w = \frac{\sum_{k=0}^{M-1} k|c(k)|^2}{\sum_{k=0}^{M-1} |c(k)|^2}$$

where c(k) designates a correlation value in position k in said vector and m is an integer, said calculated center of energy value w forming said synchronization position m.

19. A device in a TDMA radio communicating system for allowing determination of a synchronization position comprising:

means for correlating a training sequence with a complex input signal to provide correlation values and correlation value magnitudes;

a calculator having an input to receive said correlation value magnitudes and an output to provide a weighted average of said correlation value magnitudes;

a first summation unit having an input to receive said correlation value magnitudes and an output to provide a sum of the correlation value magnitudes;

a divider having a first input connected to receive said calculator output as a dividend and a second input connected to receive said first summation unit output as a divisor and an output to provide a quotient, said quotient being a center of energy value w;

means for rounding having an input connected to receive said divider output and an output to provide a value $m_w$, said value $m_w$ being the center of energy value w rounded to a nearest integer;

a second summation unit having a first input connected to receive said correlation value magnitudes and a second input connected to receive said rounding means output and an output to provide an energy value for each of a plurality of windows distributed about position $m_w$ and mutually displaced one sampling step;

means for detecting a maximum value having an input connected to receive said second summation unit output and an output to provide a window selected from said plurality of windows having a maximum energy value, said selected window having a center position m allowing for determination of said synchronization position.

20. The device of claim 19 wherein said center position m is said synchronization position.

21. The device of claim 19 further comprising means for selecting a subset of said correlation values that are substantially centered about said center position m to determine a channel estimate.

22. The device of claim 19 wherein the synchronization position is the center position m.

23. The device of claim 19 wherein the synchronization position is a center of energy position of said window selected from said plurality of windows.

* * * * *